(12) United States Patent
Trim et al.

(10) Patent No.: US 10,679,069 B2
(45) Date of Patent: Jun. 9, 2020

(54) AUTOMATIC VIDEO SUMMARY GENERATION

(71) Applicant: INTERNATIONAL BUSINESS MACHINES CORPORATION, Armonk, NY (US)

(72) Inventors: Craig M. Trim, Sylmar, CA (US); Veronica Wyatt, Chicago, IL (US); Olav Laudij, Sandy, UT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 129 days.

(21) Appl. No.: 15/937,228

(22) Filed: Mar. 27, 2018

(65) Prior Publication Data

US 2019/0303682 A1    Oct. 3, 2019

(51) Int. Cl.
*G06K 9/62*    (2006.01)
*G06K 9/00*    (2006.01)

(52) U.S. Cl.
CPC ......... *G06K 9/00751* (2013.01); *G06K 9/623* (2013.01); *G06K 9/6255* (2013.01)

(58) Field of Classification Search
None
See application file for complete search history.

(56) References Cited

U.S. PATENT DOCUMENTS

| 6,535,639 | B1 | 3/2003 | Uchihachi et al. |
| 6,925,455 | B2 | 8/2005 | Gong et al. |
| 8,432,965 | B2 | 4/2013 | Deever |
| 8,958,645 | B2 * | 2/2015 | Lu .............. H04N 5/91 382/182 |
| 9,818,451 | B1 * | 11/2017 | Tyagi ............. G11B 27/34 |
| 2003/0043172 | A1 | 3/2003 | Li et al. |
| 2012/0284094 | A1 | 11/2012 | de Leon et al. |
| 2015/0178926 | A1 * | 6/2015 | Jones ............ G06T 17/05 345/440 |
| 2016/0070962 | A1 | 3/2016 | Shetty et al. |
| 2016/0292510 | A1 * | 10/2016 | Han ............ G06K 9/00724 |
| 2017/0185846 | A1 | 6/2017 | Hwangbo et al. |
| 2017/0308756 | A1 * | 10/2017 | Sigal ............ G06T 7/62 |
| 2019/0035091 | A1 * | 1/2019 | Bi ............ G08B 13/19602 |

OTHER PUBLICATIONS

Zhang et al., "Video summarization with long short-term memory," European Conference on Computer Vision, 2016, 17 pages.

(Continued)

*Primary Examiner* — Sean M Conner
(74) *Attorney, Agent, or Firm* — James Nock; Andrew D. Wright; Roberts Calderon Safran & Cole, P.C.

(57) ABSTRACT

Methods and systems for automatic video summary generation are disclosed. A method includes: extracting, by a computing device, a plurality of frames from a video; determining, by the computing device, for each of the plurality of extracted frames, features in the frame; creating, by the computing device, a scene detection model using the determined features for each of the plurality of extracted frames; scoring, by the computing device, each of the plurality of extracted frames using the created scene detection model; and generating, by the computing device, a video summary using the scored plurality of extracted frames.

20 Claims, 9 Drawing Sheets

(56) References Cited

OTHER PUBLICATIONS

Zhou et al., "Towards Automatic Learning of Procedures from Web Instructional Videos", Nov. 21, 2017, 10 pages.
Ajmal et al., "Video Summarization: Techniques and Classification," International Conference on Computer Vision and Graphics, Springer, Berlin, Heidelberg, 2012, 13 pages.
Otani et al., "Video Summarization Using Deep Semantic Features." Asian Conference on Computer Vision, Springer, Cham, 2016, 17 pages.

\* cited by examiner

510

800

| [image 1]<br><br>Scene 1 | [image 2]<br><br>Scene 2 | [image 3]<br><br>Scene 3 | [image 4]<br><br>Scene 4 |
|---|---|---|---|
| [image 5]<br><br>Scene 5 | [image 6]<br><br>Scene 6 | [image 7]<br><br>Scene 7 | [image 8]<br><br>Scene 8 |
| [image 9]<br><br>Scene 9 | [image 10]<br><br>Scene 10 | | |

FIG. 8

AUTOMATIC VIDEO SUMMARY GENERATION

BACKGROUND

The present invention generally relates to computing devices and, more particularly, to methods and systems for automatic video summary generation.

A user may scroll through a webpage to preview the webpage and quickly get a sense of the content of the webpage. The user may then select one or more portions of the webpage that the user identified as relevant while scrolling through the webpage to review in detail. A user is unable to similarly preview or obtain an overview of a digital video. In particular, a digital video is typically represented using a single frame, which may be the first frame in the digital video or a frame that is selected as or determined to be a representative frame.

SUMMARY

In a first aspect of the invention, there is a method that includes: extracting, by a computing device, a plurality of frames from a video; determining, by the computing device, for each of the plurality of extracted frames, features in the frame; creating, by the computing device, a scene detection model using the determined features for each of the plurality of extracted frames; scoring, by the computing device, each of the plurality of extracted frames using the created scene detection model; and generating, by the computing device, a video summary using the scored plurality of extracted frames.

In another aspect of the invention, there is a computer program product that includes a computer readable storage medium having program instructions embodied therewith. The program instructions are executable by a computing device to cause the computing device to: extract a plurality of frames from a video; determine, for each of the plurality of extracted frames, features in the frame; create a scene detection model using the determined features for each of the plurality of extracted frames; score each of the plurality of extracted frames using the created scene detection model; and generate a video summary using the scored plurality of extracted frames.

In another aspect of the invention, there is a system that includes: a hardware processor, a computer readable memory, and a computer readable storage medium associated with a computing device; program instructions of a frame extractor configured to extract a plurality of frames from a video; program instructions of a feature extractor configured to determine, for each of the plurality of frames extracted by the frame extractor, features in the frame; program instructions of a scene detection model creator configured to create a scene detection model using the features for each of the plurality of frames determined by the feature extractor; program instructions of a scene detector configured to score each of the plurality of extracted frames using the scene detection model created by the scene detection model creator; and program instructions of a video summary generator configured to generate a video summary using the plurality of extracted frames scored by the scene detector, wherein the program instructions are stored on the computer readable storage medium for execution by the hardware processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

FIG. 8 depicts an example of a video summary created by the video summary creator in accordance with aspects of the invention.

DETAILED DESCRIPTION

Figure 1:
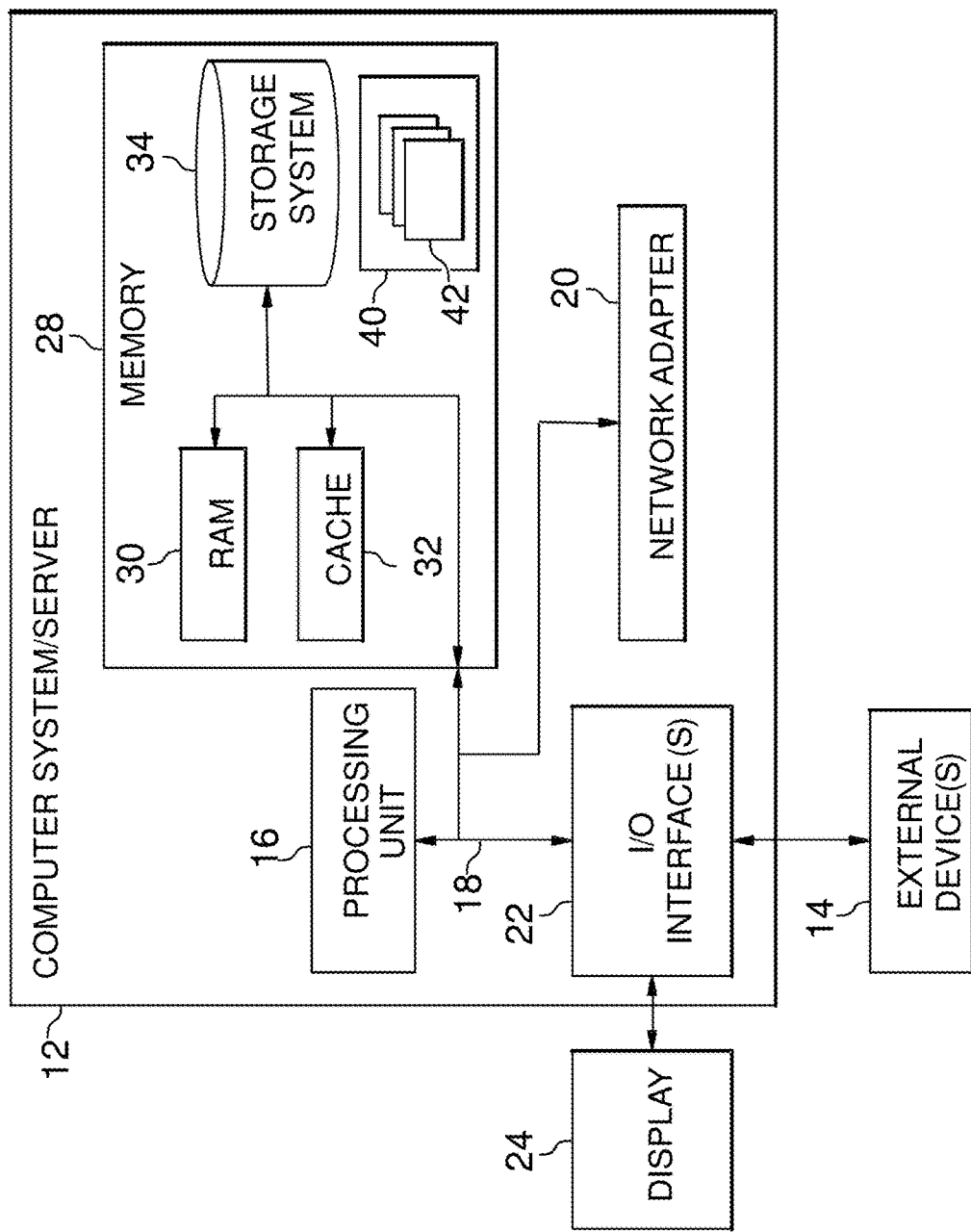
FIG. 1 depicts a computer system in accordance with aspects of the invention.

The present invention generally relates to computing devices and, more particularly, to methods and systems for automatic video summary generation. Aspects of the invention automatically summarize a digital video into relevant screenshots which provide an overview of the digital video and offer jump-in points to start viewing a relevant scene or portion of the digital video. As described herein, aspects of the invention include a method and system for downloading a video, extracting frames from the downloaded video, extracting features from the frames, creating a scene detection model, detecting scenes using the scene detection model, validating the scenes, and creating a video summary using the validated scenes.

In the related art approach of representing a digital video using a single frame, it is difficult for a user to quickly identify relevant portions of the digital video. While a user can scroll through a webpage to preview the webpage and quickly get a sense of the content of the webpage, in the related art approach of representing a digital video using a single frame, there is no analogous way for a user to preview the digital video and quickly get a sense of the content of the digital video. Additionally, there is no way for a user to quickly jump into the digital video (e.g., start playback in the digital video) at a relevant scene or other relevant point in the digital video. Embodiments of the invention address this problem by providing methods and systems for automatically summarizing a digital video that allow for easier identification of and jumping to a relevant portion of or scene in the digital video as compared to the related art approach of representing a digital video using a single frame.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
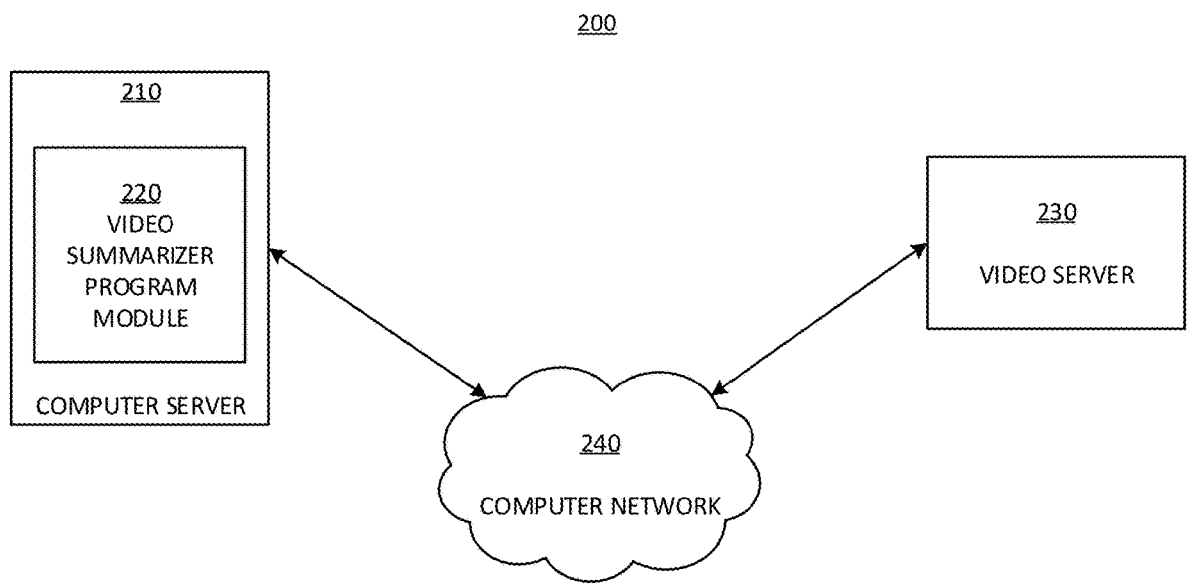
FIG. 2 depicts an illustrative environment in accordance with aspects of the invention.

FIG. 2 depicts an illustrative environment 200 in accordance with aspects of the invention. As shown, the environment 200 comprises a computer server 210 which is in communication with a video server 230 via a computer network 240. The computer network 240 may be any suitable network such as a LAN, WAN, or the Internet. The computer server 210 and the video server 230 may be physically collocated, or may be situated in separate physical locations.

The quantity of devices and/or networks in the environment 200 is not limited to what is shown in FIG. 2. In practice, the environment 200 may include additional devices and/or networks; fewer devices and/or networks; different devices and/or networks; or differently arranged devices and/or networks than illustrated in FIG. 2. Also, in some implementations, one or more of the devices of the environment 200 may perform one or more functions described as being performed by another one or more of the devices of the environment 200.

In embodiments, the computer server 210 may be a computer server 12 as shown in FIG. 1. The computer server 210 may be implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, the computer server 210 may include a video summarizer program module 220, which may include hardware and/or software and may be one or more of the program modules 42 shown in FIG. 1. According to an embodiment, the video summarizer program module 220 includes program instructions for automatic video summary generation. The program instructions included in the video summarizer program module 220 of the computer server 210 may be executed by one or more hardware processors. According to an embodiment, the video summarizer program module 220 performs functions related to downloading a video, extracting frames from the downloaded video, extracting features from the frames, creating a scene detection model, detecting scenes using the scene detection model, validating the scenes, and creating a video summary using the validated scenes.

Still referring to FIG. 2, in embodiments, the video server 230 may be a computer server 12 as shown in FIG. 1. The video server 230 may be implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, the video server 230 may store digital videos or links to digital videos. The video server 230 may provide a digital video to the computer server 210 in response to a request from the computer server 210. Alternatively, the video server 230 may provide a link to a digital video to the computer server 210 in response to a request from the computer server 210. The digital videos stored on or linked to by the video server 230 may use any digital video container format (e.g., MP4 or any other container format) and may use any digital video compression standard (e.g., High Efficiency Video Coding [HEVC or H.265] or any other compression standard). The video server 230 may be hosted by or provided by a third party. For example, the video server 230 may be provided as a web service.

Figure 3:
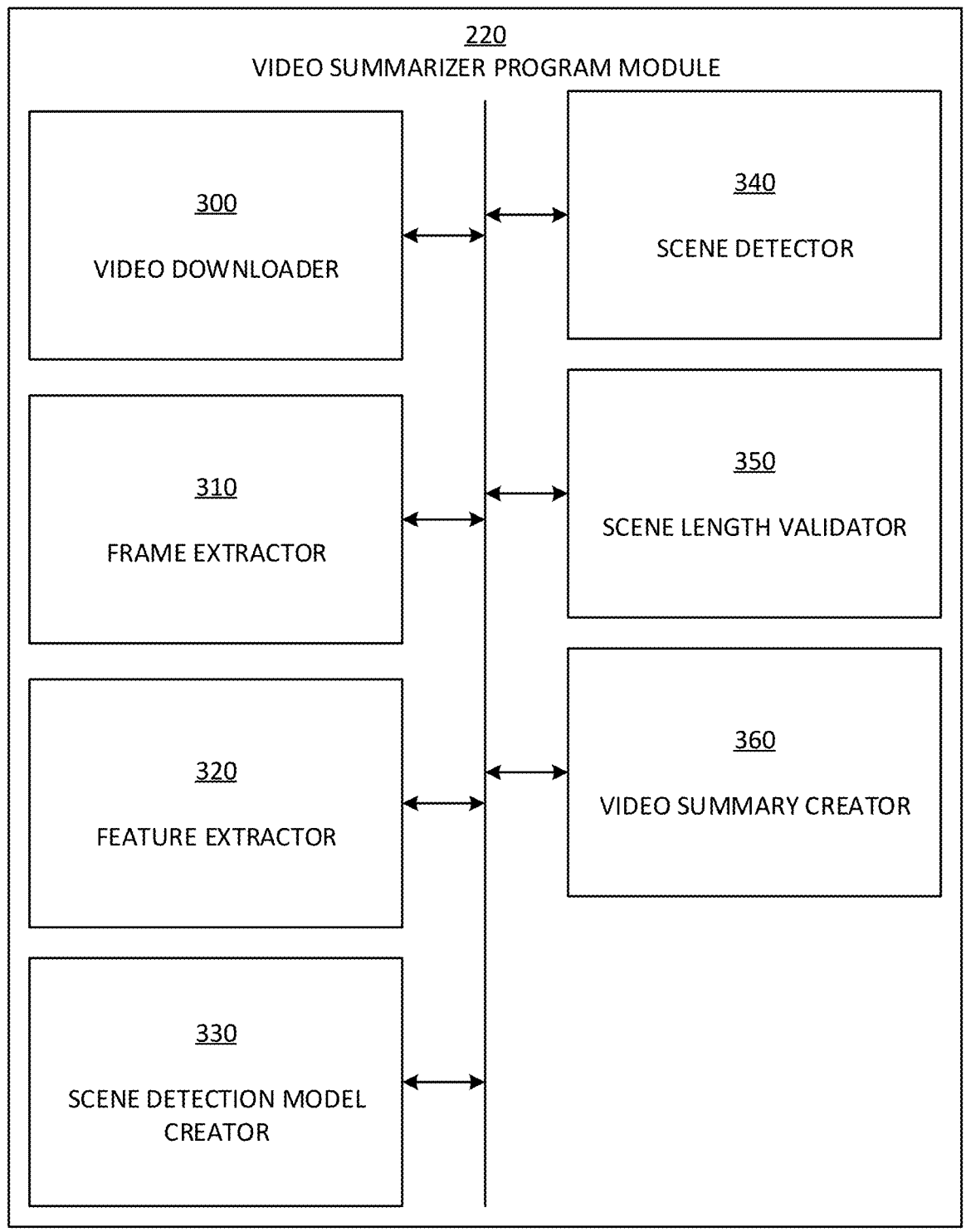
FIG. 3 depicts a block diagram of an exemplary program module in accordance with aspects of the invention.

FIG. 3 depicts a block diagram of an exemplary video summarizer program module 220 in the server 210 (of FIG. 2) in accordance with aspects of the invention. In embodiments, the video summarizer program module 220 includes a video downloader 300, a frame extractor 310, a feature extractor 320, a scene detection model creator 330, a scene detector 340, a scene length validator 350, and a video summary creator 360, each of which may comprise one or more program modules 42 as described with respect to FIG. 1. In embodiments, the video summarizer program module 220 may include additional or fewer components than those shown in FIG. 3. In embodiments, separate components may be integrated into a single computing component or module. Additionally, or alternatively, a single component may be implemented as multiple computing components or modules.

In embodiments, the video downloader 300 downloads a digital video from the video server 230. The video downloader 300 may send a request for a video to the video server 230, and in response to the request, the video server 230 may provide the video to the video downloader 300. Alternatively, in response to the request, the video server 230 may provide a link to a video to the computer server 210, and the computer server 210 may then request the video from a location identified in the link. The video downloader 300 may store the received video in a storage device located in or accessible to the computer server 210.

In embodiments, the frame extractor 310 extracts frames from the digital video downloaded by the video downloader 300. The frame extractor 310 may use a video decoder to decompress and/or decode the digital video into a plurality of frames. For example, a video may be encoded using a video encoder that is compliant with the HEVC standard. This video may be decoded by the frame extractor 310 into a plurality of frames using a video decoder that is compliant with the HEVC standard.

The frame extractor 310 may store the plurality of decompressed/decoded frames, as the extracted frames, in a storage device located in or accessible to the computer server 210. Alternatively, or additionally, the frame extractor 310 may make available or otherwise provide the plurality of plurality of decompressed/decoded frames to other components of the video summarizer program module 220, including but not limited to the feature extractor 320, the scene detection model creator 330, the scene detector 340, and the video summary creator 360.

The number of frames extracted by the frame extractor 310 from the digital video downloaded by the video downloader 300 may be based on a frame rate of the video and a length of the video. The frame extractor 310 may extract every frame from the video as decoded by a video decoder. For example, a video may have a frame rate of 24 frames per second and a length of 300 seconds. In the case of this example video, the frame extractor 310 may decode the video using a video decoder into 7,200 frames, and the 7,200 frames may be stored as the extracted frames in a storage device located in or accessible to the computer server 210.

According to another embodiment, the frame extractor 310 may extract a predetermined number of frames from a video downloaded by the video downloader 300. The video extractor 310 may be configured to divide the number of frames in the video as decoded by a video decoder by the number of frames to be extracted to determine a quotient n, and extract every nth frame from the video. For example, the frame extractor 310 may be configured to extract 1,000 frames. In the case of a video that is decoded into 10,000 frames, the frame extractor 310 may extract every tenth frame from the video and store the 1,000 extracted frames in a storage device located in or accessible to the computer server 210.

According to yet another embodiment, the frame extractor 310 may extract frames at predetermined time intervals in a video downloaded by the video downloader 300. For example, the frame extractor 310 may be configured to extract a frame every 30 seconds from the video as decoded by a video decoder. In the case of a 60-minute video, the frame extractor 310 may extract 120 frames and store the 120 extracted frames in a storage device located in or accessible to the computer server 210.

Still referring to FIG. 3, in embodiments, the feature extractor 320 scores each of the frames (i.e., images) extracted by the frame extractor 310 in a pretrained deep learning model (i.e., using a machine learning algorithm) to extract features of the frame. The feature extractor 320 may summarize the features of each of the scored frames in an array of 4,096 numbers using the pretrained deep learning model.

According to an embodiment, the feature extractor 320 may score each of the frames using a pretrained convolutional neural network such as the VGG19 model, which uses 19 layers and 143 million parameters. The VGG19 model may be used to classify each of the frames (images) extracted by the frame extractor 310 into 1,000 separate object categories. For example, the VGG19 model may infer object categories including a theater curtain, wardrobe, and book jacket in a frame extracted by the frame extractor 310. The feature extractor 320 may also use any other model to extract the features of each of the frames and any other representation to summarize the features of each of the frames. Embodiments are not limited to using the VGG19 model and may use other pretrained convolutional neural networks.

Still referring to FIG. 3, in embodiments, the scene detection model creator 330 builds a scene detection model to distinguish successive frames extracted from the video by the frame extractor 310 from random frame pairs using the features extracted by the feature extractor 320. The scene detection model built by the scene detection model creator 330 may be a model that is used to score each frame extracted by the frame extractor 310. The score output by the scene detection model may represent a likelihood that the scored frame is from a different scene as compared to the previous frame. For example, the scene detection model may output a score between 0 and 1, and a higher score may represent a comparatively higher likelihood that a frame is from a different scene as compared to the previous frame.

A t-distributed stochastic neighbor embedding (t-SNE) algorithm may be used to confirm that frames extracted by the frame extractor 310 that make up a particular scene are modeled as nearby points in a graph (e.g., the frames that make up a particular scene are modeled as a series of connected images) while frames that make up other scenes are modeled in other parts of the graph (e.g., distant points in the graph). Such confirmation ensures that the deep learning model selected for use by the feature extractor 310 extracts features useful for building the scene detection model using the scene detection model creator 330. Embodiments are not limited to using the t-SNE algorithm and may use other algorithms instead.

The scene detection model creator 330 creates a scene detection dataset using the frames extracted by the frame extractor 310 as training data. In particular, the scene detection model creator 330 uses a plurality of pairs of successive frames, as represented by the features extracted by the feature extractor 320, selected from the frames extracted by the frame extractor 310 as training data with an associated label of "no new scene." The scene detection model creator 330 also uses a plurality of pairs of random frames, as represented by the features extracted by the feature extractor 320, selected from the frames extracted by the frame extractor 310 as training data with an associated label of "new scene."

Some pairs of frames used as training data may be misclassified. However, the misclassifications are comparatively infrequent and therefore do not impact the robustness of the training data. For example, the training data may include some pairs of successive frames that are from different scenes but that are incorrectly associated with the label "no new scene." Likewise, the training data may include some pairs of random frames that are from the same scene but that are incorrectly associated with the label "new scene."

The scene detection model creator 330 may, for each pair of frames included in the training data, use a (2, 1) convolutional kernel to make pairwise comparisons between each of the 4,096 features of the frames extracted by the feature extractor 320. In this manner, by comparing the frames in each pair of frames in the training data, including the pairs of frames with the "no new scene" label in the training data and the pairs of frames with the "new scene" label in the training data, the scene detection model creator 330 may use machine learning to learn to predict whether or not two frames are from different scenes, thereby creating the scene detection model.

Still referring to FIG. 3, in embodiments, the scene detector 340 uses the scene detection model created by the scene detection model creator 330 to score each of the frames extracted by the frame extractor 310 as represented by the features extracted by the feature extractor 320. The scene detector 340 may use a predetermined threshold score to determine whether or not a frame is considered to belong to a new scene as compared to the previous frame. A frame having a score that exceeds the predetermined threshold score may be considered to be the first frame of a new scene, and all of the frames following that frame up to the frame immediately preceding the next frame having a score that exceeds the predetermined threshold score may be considered to be part of the same scene. For example, the scene detector 340 may use 0.5 as the predetermined threshold score, and each frame scoring at or above 0.5 may be considered to be the first frame of a new scene. Embodiments are not limited to using 0.5 as the predetermined threshold and may use other values instead.

Alternatively, the scene detector 340 may dynamically determine a threshold score based upon a predetermined target number of scenes. That is, the threshold score may be determined such that a predetermined target number or percentage of frames have scores exceeding the threshold score.

Still referring to FIG. 3, in embodiments, the scene length validator 350 determines a length of each of the scenes identified by the scene detector 340. For example, the scene length validator 350 may determine a number of frames in each of the scenes identified by the scene detector 340 or a running time of each of the scenes identified by the scene detector 340. If a scene meets or exceeds a predetermined minimum scene length (e.g., a predetermined minimum number of frames or a predetermined minimum running time), then the scene length validator 350 may determine that the scene is a valid scene.

On the other hand, if the scene does not meet the predetermined minimum scene length, then the scene length validator 350 may determine that the scene is not a valid scene. In response to determining that the scene is not a valid scene, the scene length validator 350 may be configured to determine that the scene is a part of the following scene. Alternatively, in response to determining that the scene is not a valid scene, the scene length validator 350 may be configured to determine that the scene is a part of the preceding scene.

Still referring to FIG. 3, in embodiments, the video summary creator 360 automatically creates a video summary or overview that includes representations of some or all of the scenes identified by the scene detector 340 and validated by the scene length validator 350. According to an embodiment, the video summary creator 360 selects a frame from each of the scenes identified by the scene detector 340 and validated by the scene length validator 350 as a representative frame and generates a graphical display including the selected representative frames as the video summary.

The video summary creator 360 may cause the graphical display to be displayed on a display 24 (as shown in FIG. 1) of the computer server 210 (as shown in FIG. 2). Alternatively, the video summary creator 360 may cause the graphical display to be displayed on a display 24 of another computer system 12 (as shown in FIG. 1) or other device that is used by a user. The representative frames in the video summary created by the video summary creator 360 may be clickable or otherwise selectable, and in response to a click or selection, the video may be started at the beginning of the scene associated with the clicked or selected representative frame.

For example, the video summary creator 360 may select the $25^{th}$ frame from each of the scenes identified by the scene detector 340 and validated by the scene length validator 350 as representative frames. In the case of a video having ten scenes identified by the scene detector 340 and validated by the scene length validator 350, the video summary creator 360 may display the $25^{th}$ frame from each of the ten scenes in a grid format or any other format as the video summary. Alternatively, the video summary creator 360 may display the $25^{th}$ frame from each of the ten scenes in a visual manner similar to a comic strip, for example.

According to an embodiment, if the number of scenes identified by the scene detector 340 and validated by the scene length validator 350 exceeds a predetermined maximum number of scenes, the video summary creator 360 may select a representative frame from each scene in a set of selected scenes. Any criteria may be used to select the scenes in the set of selected scenes. For example, scenes may be selected using time intervals. Alternatively, every nth scene may be selected.

Figure 4:
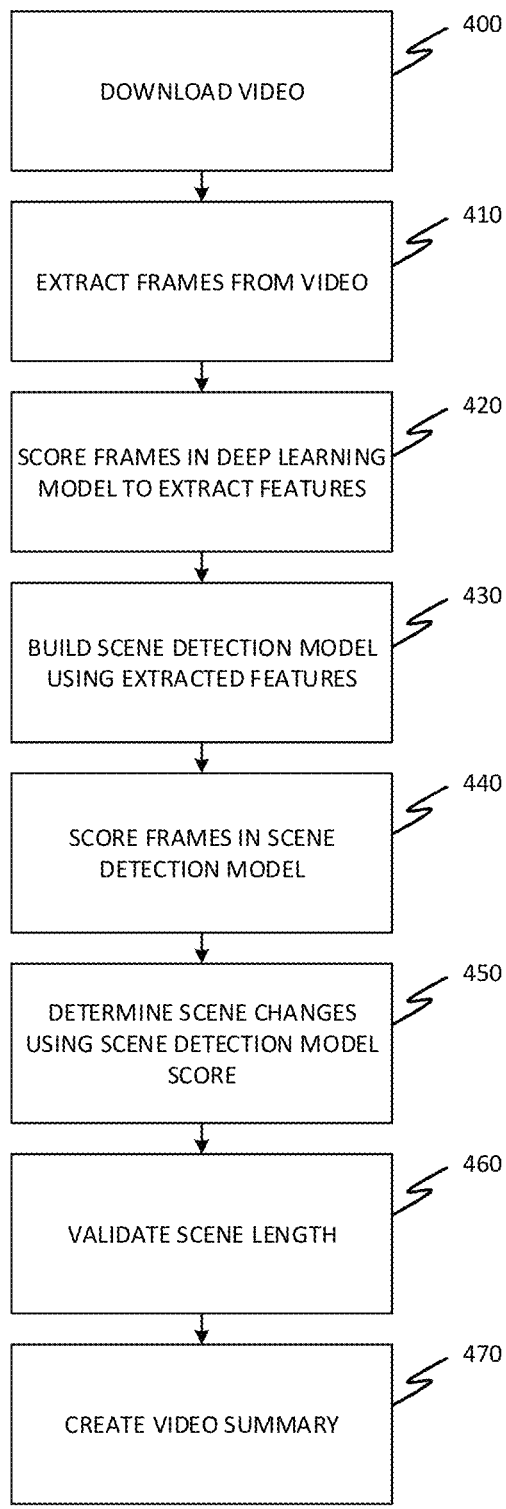
FIG. 4 depicts a flowchart of an exemplary method in accordance with aspects of the invention.

FIG. 4 depicts a flowchart of an exemplary method in accordance with aspects of the invention. The steps of the method may be performed in the environment of FIG. 2 and are described with reference to the elements and steps described with respect to FIGS. 1, 2, and 3.

At step 400, the system downloads a video. In embodiments, as described with respect to FIG. 3, step 400 comprises the video downloader 300 downloading a video from the video server 230.

At step 410, the system extracts frames from the video downloaded at step 400. In embodiments, as described with respect to FIG. 3, step 410 comprises the frame extractor 310 extracting frames from the video downloaded by the video downloader 300.

At step 420, the system scores the frames extracted at step 410 in a deep learning model to extract features. In embodiments, as described with respect to FIG. 3, step 420 comprises the feature extractor 320 scoring each of the frames extracted by the frame extractor 310 using a pretrained convolutional neural network such as the VGG19 model and summarizing the features of each of the scored frames in an array of 4,096 numbers.

At step 430, the system builds a scene detection model using features extracted at step 420. In embodiments, as described with respect to FIG. 3, step 430 comprises the scene detection model creator 330 building a scene detection model to distinguish successive frames extracted from the video by the frame extractor 310 from random frame pairs using the features extracted by the feature extractor 320.

At step 440, the system then scores each of the frames extracted at step 410, as represented by the features extracted at step 420, in the scene detection model built at step 430. In embodiments, as described with respect to FIG. 3, step 440 comprises the scene detector 340 340 using the scene detection model created by the scene detection model creator 330 to score each of the frames extracted by the frame extractor 310.

At step 450, the system determines scene changes using the scene detection model score for each of the frames generated at step 440. In embodiments, as described with respect to FIG. 3, step 450 comprises the scene detector 340 using a predetermined threshold score to determine whether or not a frame is considered to belong to a new scene as compared to the previous frame. A frame having a score that exceeds the predetermined threshold score may be considered to be the first frame of a new scene, and all of the frames following that frame up to the frame immediately preceding the next frame having a score that exceeds the predetermined threshold score may be considered to be part of the same scene.

At step 460, the system validates the length of each of the scenes identified at step 450. In embodiments, as described with respect to FIG. 3, step 460 comprises the scene length validator 350 determining a length of each of the scenes identified by the scene detector 340. If a scene meets or exceeds a predetermined minimum scene length (e.g., a predetermined minimum number of frames or a predetermined minimum running time), then the scene length validator 350 may determine that the scene is a valid scene. On the other hand, if the scene does not meet the predetermined minimum scene length, then the scene length validator 350 may determine that the scene is not a valid scene. In response to determining that the scene is not a valid scene, the scene length validator 350 may be configured to determine that the scene is a part of the following scene or the preceding scene.

At step 470, the system creates a video summary using the scenes identified at step 450 and validated at step 460. In embodiments, as described with respect to FIG. 3, step 470 comprises the video summary creator 360 creates a video summary that includes representations of some or all of the scenes identified by the scene detector 340 and validated by the scene length validator 350.

Figure 5A:
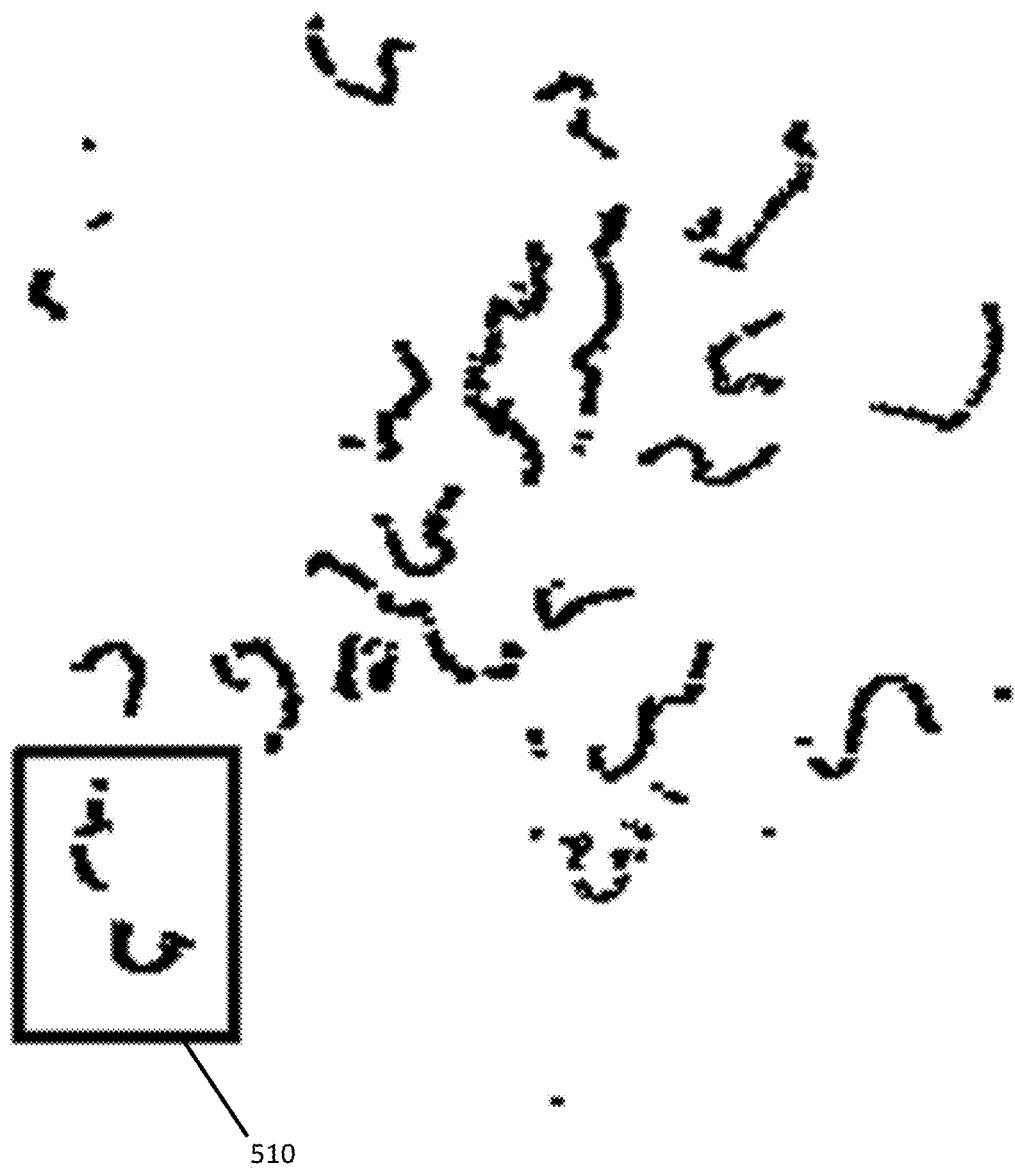
FIGS. 5A and 5B depict an example of frames extracted by the frame extractor modeled using a t-SNE algorithm in accordance with aspects of the invention.
Figure 5B:
Figure 5B:

FIGS. 5A and 5B depict an example of frames extracted by the frame extractor 310 modeled using a t-SNE algorithm on graph 500 in accordance with aspects of the invention. Frames that make up a particular scene 510 are modeled as nearby points in the graph 500. Frames that make up other scenes are modeled in other parts of the graph 500.

Figure 6:
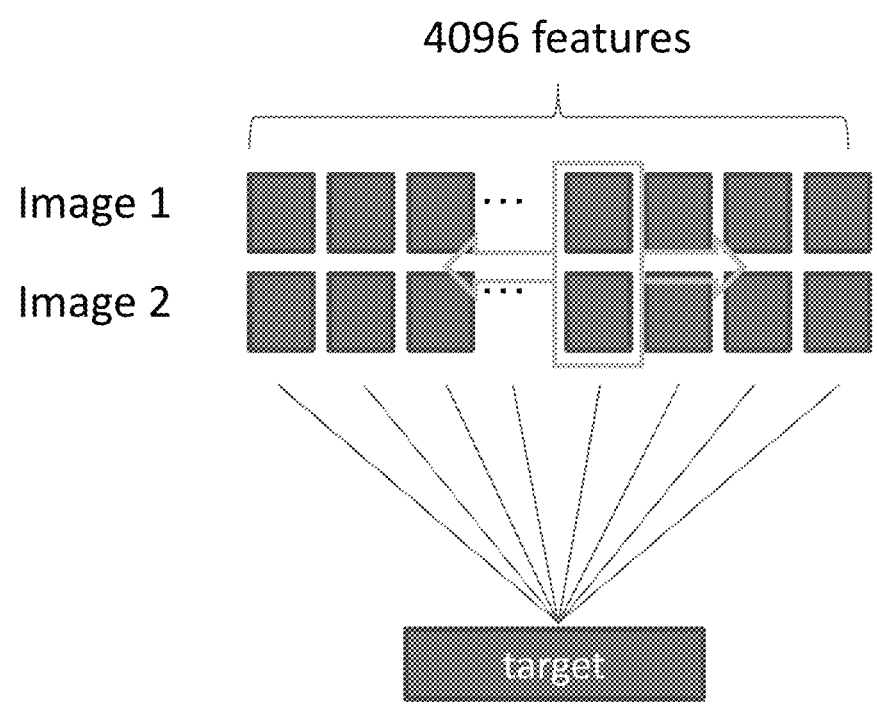
FIG. 6 illustrates the pairwise comparisons made by the scene detection model creator in accordance with aspects of the invention.

FIG. 6 illustrates the pairwise comparisons made by the scene detection model creator 330 of FIG. 3, using a (2, 1) convolutional kernel, between each of the 4,096 features (extracted by the feature extractor 320 of FIG. 3) of each frame in a pair of frames in the training data, in accordance with aspects of the invention.

Figure 7:
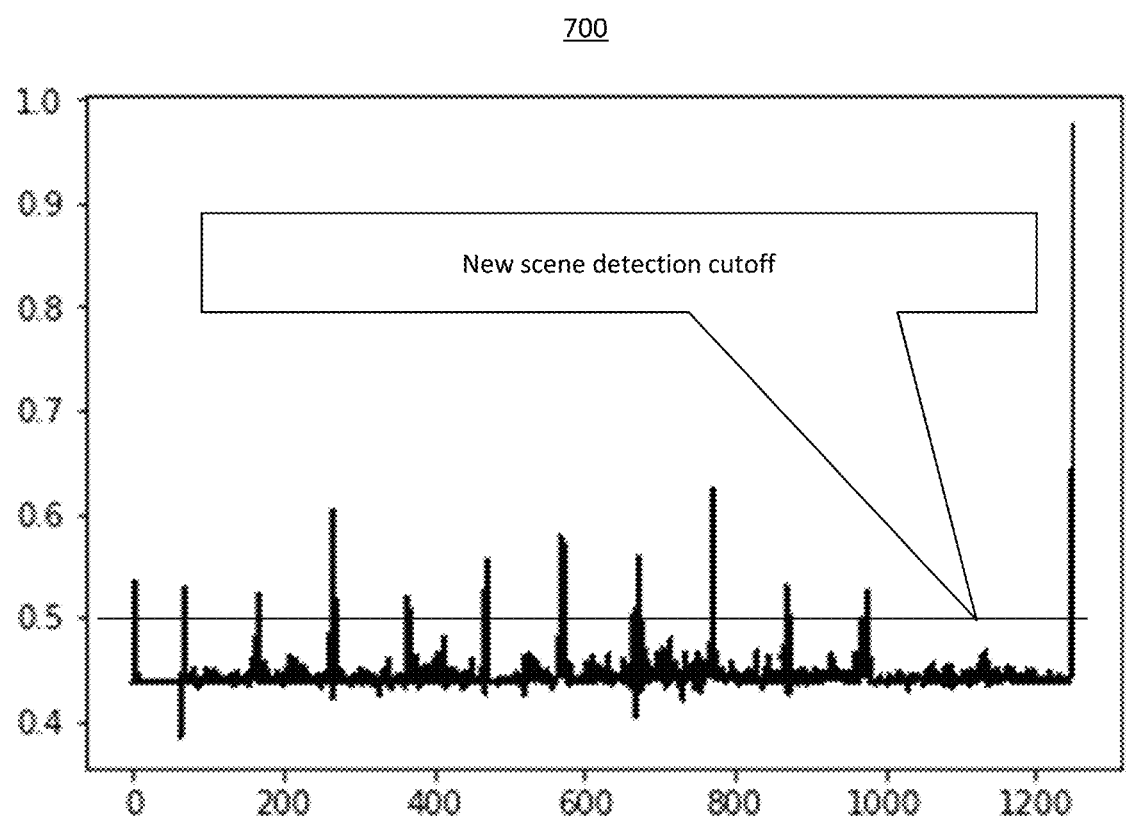
FIG. 7 depicts an example of a graph of frame scores determined using the scene detector in accordance with aspects of the invention.

FIG. 7 depicts an example of a graph 700 of frame scores determined using the scene detector 340 in accordance with aspects of the invention. The scene detector 340 may use a predetermined threshold score (new scene detection cutoff) of 0.5 to determine whether or not a frame is considered to belong to a new scene as compared to the previous frame. A frame having a score that exceeds the predetermined threshold score may be considered to be the first frame of a new scene, and the all of the frames following that frame up to the frame immediately preceding the next frame having a score that exceeds the predetermined threshold score may be considered to be part of the same scene.

FIG. 8 depicts an example of a video summary 800 that is automatically created by the video summary creator 360 in accordance with aspects of the invention. The video summary 800 is a depicted as a grid that includes a representative frame for each of 10 scenes in a video. The representative frames in the video summary created by the video summary creator 360 may be clickable or otherwise selectable, and in response to a click or selection, the video may be started at the beginning of the scene associated with the clicked or selected representative frame.

Accordingly, the system improves the functioning of a computer by providing for automatic generation of a video summary. Additionally, the system improves the functioning of a computer by providing the functionality of jumping into the video (e.g., starting playback) at a point corresponding to any scene represented in the video summary. This improved functionality allows a user to save time by reviewing the video summary and the jumping into the video at a point (i.e., a scene) that is relevant to the user's interest, rather than having to waste time by watching the entire video to locate the relevant scene. Additionally, the system uses techniques that are rooted in computer technology (e.g., convolutional neural networks) that cannot be performed manually by a person.

In embodiments, a service provider could offer to perform the processes described herein. In this case, the service provider can create, maintain, deploy, support, etc., the computer infrastructure that performs the process steps of the invention for one or more customers. These customers may be, for example, any business that uses cloud computing technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   extracting, by a computing device, a plurality of frames from a video;
   determining, by the computing device, for each of the plurality of extracted frames, features in the frame;
   creating, by the computing device, a scene detection model using the determined features for each of the plurality of extracted frames, including using as training data a plurality of pairs of successive frames from the plurality of extracted frames and a plurality of pairs of random frames from the plurality of extracted frames and using the determined features to make pairwise comparisons between features of each of the plurality of pairs of successive frames and each of the plurality of pairs of random frames;
   scoring, by the computing device, each of the plurality of extracted frames using the created scene detection model; and
   generating, by the computing device, a video summary using the scored plurality of extracted frames.

2. The method according to claim 1, wherein the determining the features in the frame comprises using a pretrained convolutional neural network.

3. The method according to claim 2, wherein the pretrained convolutional neural network is a VGG19 model.

4. The method according to claim 1, wherein the pairwise comparisons are made using a convolutional kernel.

5. The method according to claim 1, wherein the scoring each of the plurality of extracted frames using the created scene detection model comprises determining a plurality of scenes, each scene in the plurality of scenes being started by a frame having a score exceeding a dynamically determined threshold,
   wherein the dynamically determined threshold is determined such that a predetermined target number or percentage of frames have the score exceeding the dynamically determined threshold.

6. The method according to claim 1, wherein the scoring each of the plurality of extracted frames using the created scene detection model comprises determining a plurality of scenes, each scene in the plurality of scenes being started by a frame having a score exceeding a predetermined threshold.

7. The method according to claim 6, wherein the generating the video summary comprises selecting a representative frame from each of the plurality of scenes and generating a graphical display including the selected representative frames.

8. The method according to claim 7, wherein each of the representative frames is selectable, and in response to a selection of a representative frame, video playback is started from a scene corresponding to the selected representative frame.

9. A computer program product comprising a computer readable storage medium having program instructions embodied therewith, the program instructions executable by a computing device to cause the computing device to:
   extract a plurality of frames from a video;
   determine, for each of the plurality of extracted frames, features in the frame;
   create a scene detection model using the determined features for each of the plurality of extracted frames, including using as training data a plurality of pairs of successive frames from the plurality of extracted frames and a plurality of pairs of random frames from the plurality of extracted frames and using the determined features to make pairwise comparisons between features of each of the plurality of pairs of successive frames and each of the plurality of pairs of random frames;
   score each of the plurality of extracted frames using the created scene detection model; and
   generate a video summary using the scored plurality of extracted frames.

10. The computer program product according to claim 9, wherein the determining the features in the frame comprises using a pretrained convolutional neural network.

11. The computer program product according to claim 10, wherein the pretrained convolutional neural network is a VGG19 model.

12. The computer program product according to claim 9, wherein the pairwise comparisons are made using a convolutional kernel.

13. The computer program product according to claim 9, wherein the scoring each of the plurality of extracted frames using the created scene detection model comprises determining a plurality of scenes, each scene in the plurality of scenes being started by a frame having a score exceeding a dynamically determined threshold,
   wherein the dynamically determined threshold is determined such that a predetermined target number or percentage of frames have the score exceeding the dynamically determined threshold.

14. The computer program product according to claim 9, wherein the scoring each of the plurality of extracted frames using the created scene detection model comprises determining a plurality of scenes, each scene in the plurality of scenes being started by a frame having a score exceeding a predetermined threshold.

15. The computer program product according to claim 14, wherein the generating the video summary comprises selecting a representative frame from each of the plurality of scenes and generating a graphical display including the selected representative frames.

16. The computer program product according to claim 15, wherein each of the representative frames is selectable, and in response to a selection of a representative frame, video playback is started from a scene corresponding to the selected representative frame.

17. A system comprising:
  a hardware processor, a computer readable memory, and a computer readable storage medium associated with a computing device;
  program instructions of a frame extractor configured to extract a plurality of frames from a video;
  program instructions of a feature extractor configured to determine, for each of the plurality of frames extracted by the frame extractor, features in the frame;
  program instructions of a scene detection model creator configured to create a scene detection model using the features for each of the plurality of frames determined by the feature extractor, including using as training data a plurality of pairs of successive frames from the plurality of frames extracted by the frame extractor and a plurality of pairs of random frames from the plurality of frames extracted by the frame extractor and using the determined features to make pairwise comparisons between features of each of the plurality of pairs of successive frames and each of the plurality of pairs of random frames;
  program instructions of a scene detector configured to score each of the plurality of extracted frames using the scene detection model created by the scene detection model creator; and
  program instructions of a video summary generator configured to generate a video summary using the plurality of extracted frames scored by the scene detector,
  wherein the program instructions are stored on the computer readable storage medium for execution by the hardware processor via the computer readable memory.

18. The system according to claim 17, wherein:
  the scene detector is further configured to determine a plurality of scenes, each scene in the plurality of scenes being started by a frame having a score exceeding a predetermined threshold, and
  the video summary generator is further configured to select a representative frame from each of the plurality of scenes determined by the scene detector and generate a graphical display including the selected representative frames.

19. The method according to claim 1, wherein the plurality of pairs of successive frames are labeled as "no new scene" in the training data and the plurality of pairs of random frames are labeled as "new scene" in the training data.

20. The method according to claim 19, wherein:
  the scoring each of the plurality of extracted frames using the created scene detection model comprises determining a plurality of scenes, each scene in the plurality of scenes being started by a frame having a score exceeding a dynamically determined threshold, and
  the generating the video summary comprises selecting a representative frame from each of the plurality of scenes and generating a graphical display including the selected representative frames, and
  further comprising:
    determining, by the computing device, a length of each of the plurality of scenes, including a first scene and a second scene, based on a number of frames or a running time; and
    in response to the determined length of the second scene being less than a predetermined threshold, the computing device determining that the second scene is a part of the first scene which precedes the second scene.

* * * * *